US012783270B2

(12) United States Patent
Tamano et al.

(10) Patent No.: US 12,783,270 B2
(45) Date of Patent: Nov. 3, 2026

(54) VERIFICATION SYSTEM, VERIFICATION METHOD, AND RECORDING MEDIUM

(71) Applicant: Panasonic Intellectual Property Management Co., Ltd., Osaka (JP)

(72) Inventors: Hirokazu Tamano, Osaka (JP); Takahiko Kamitsuji, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 887 days.

(21) Appl. No.: 17/582,698

(22) Filed: Jan. 24, 2022

(65) Prior Publication Data

US 2022/0300316 A1 Sep. 22, 2022

(30) Foreign Application Priority Data

Mar. 19, 2021 (JP) ................................ 2021-045994

(51) Int. Cl.
*G06F 9/455* (2018.01)

(52) U.S. Cl.
CPC .................... *G06F 9/45558* (2013.01); *G06F 2009/45591* (2013.01)

(58) Field of Classification Search
CPC ................... G06F 9/45558; G06F 2009/45591
See application file for complete search history.

(56) References Cited

U.S. PATENT DOCUMENTS

| | | | | |
|---|---|---|---|---|
| 6,275,890 | B1 * | 8/2001 | Lee | G06F 13/36 710/39 |
| 11,012,566 | B1 * | 5/2021 | Velusamy | H04L 9/3228 |
| 11,860,768 | B1 * | 1/2024 | Bansal | G06F 11/3466 |
| 2007/0101199 | A1 * | 5/2007 | Kosuge | G06F 11/2221 714/E11.163 |
| 2007/0156323 | A1 | 7/2007 | Urano et al. | |

(Continued)

FOREIGN PATENT DOCUMENTS

| | | |
|---|---|---|
| JP | 2005-090353 A | 4/2005 |
| JP | 2008-269022 A | 11/2008 |

(Continued)

OTHER PUBLICATIONS

Office Action mailed on Mar. 7, 2023 for corresponding Japanese patent application No. 2021-045994 with English translation thereof.

*Primary Examiner* — April Y Blair
(74) *Attorney, Agent, or Firm* — Greenblum & Bernstein, P.L.C.

(57) ABSTRACT

A verification system (for example, a PC) is a system which verifies, as a verification target, a control device that controls a control target. The verification system includes: an actual responsiveness obtaining unit which obtains actual responsiveness that is responsiveness for verification performed on the verification target in a real environment in which the control target is configured by hardware; a virtual responsiveness obtaining unit which obtains virtual responsiveness that is responsiveness for verification performed on the verification target in a virtual environment in which the control target is virtually configured; and a changing unit which changes a setting of the virtual environment to bring the virtual responsiveness closer to the actual responsiveness.

10 Claims, 5 Drawing Sheets

(56) References Cited

U.S. PATENT DOCUMENTS

| | | | | |
|---|---|---|---|---|
| 2010/0306590 | A1* | 12/2010 | Anand | G06F 11/3664 714/38.1 |
| 2013/0167159 | A1* | 6/2013 | Ricci | G06F 21/10 719/319 |
| 2015/0262434 | A1* | 9/2015 | Schnorbus | G01N 33/004 702/123 |
| 2016/0048405 | A1* | 2/2016 | Lang | G06F 9/45558 718/1 |
| 2017/0132030 | A1* | 5/2017 | Iguchi | G06F 9/5077 |
| 2021/0132977 | A1* | 5/2021 | Maegawa | G06F 11/3698 |
| 2021/0248288 | A1 | 8/2021 | Murashima et al. | |
| 2022/0108052 | A1 | 4/2022 | Orimoto et al. | |

FOREIGN PATENT DOCUMENTS

| | | | |
|---|---|---|---|
| JP | 2019-179284 | A | 10/2019 |
| WO | WO 2020/017264 | A1 | 1/2020 |
| WO | WO 2021/038636 | A1 | 3/2021 |

* cited by examiner

VERIFICATION SYSTEM, VERIFICATION METHOD, AND RECORDING MEDIUM

CROSS REFERENCE TO RELATED APPLICATION

The present application is based on and claims priority of Japanese Patent Application No. 2021-045994 filed on Mar. 19, 2021.

FIELD

The present disclosure relates to a verification system, a verification method, and a recording medium which verify, as a verification target, a control device that controls a control target.

BACKGROUND

Conventionally, in software development of a control device which controls a control target, in general, the control device is first verified in a virtual environment in which the control target is virtually configured, and then, the control device is verified in a real environment in which the control target is configured by hardware. For example, PTL 1 discloses a simulation device which is capable of using the data that has been used in the verification in a virtual environment (software simulation device) for verification in a real environment (hardware simulation device) with no change to the data.

CITATION LIST

Patent Literature

PTL 1: Japanese Unexamined Patent Application Publication No. 2008-269022

SUMMARY

However, the simulation device according to PTL 1 can be improved upon.

In view of this, the present disclosure provides a verification system and the like capable of improving upon the above related art.

A verification system according to one aspect of the present disclosure is a verification system which verifies, as a verification target, a control device that controls a control target. The verification system includes: an actual responsiveness obtaining unit which obtains actual responsiveness that is responsiveness for verification performed on the verification target in a real environment in which the control target is configured by hardware; a virtual responsiveness obtaining unit which obtains virtual responsiveness that is responsiveness for verification performed on the verification target in a virtual environment in which the control target is virtually configured; and a changing unit which changes a setting of the virtual environment to bring the virtual responsiveness closer to the actual responsiveness.

Moreover, a verification method according to one aspect of the present disclosure is a verification method for verifying, as a verification target, a control device that controls a control target. The verification method includes: obtaining actual responsiveness that is responsiveness for verification performed on the verification target in a real environment in which the control target is configured by hardware; obtaining virtual responsiveness that is responsiveness for verification performed on the verification target in a virtual environment in which the control target is virtually configured; and changing a setting of the virtual environment to bring the virtual responsiveness closer to the actual responsiveness.

Moreover, a non-transitory computer-readable recording medium for use in a computer, the recording medium having a computer program recorded thereon for causing the computer to execute the verification method described above.

A verification system and the like according to one aspect of the present disclosure is capable of improving upon the above related art, and accurately performing verification with the same operational scenario between a virtual environment and a real environment.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Embodiment

PTL 1 fails to disclose how the data that has been used for the verification in a virtual environment can be used for verification in a real environment with no change to the data. Responsiveness differs between when the control target is actual hardware as in a real environment and when the control target is emulation by software as in a virtual environment. Hence, it is difficult to use the data that has been used for the verification in the virtual environment for verification in the real environment with no change to the data. Accordingly, it is difficult to accurately perform verification with the same operational scenario between the virtual environment and the real environment.

In view of the above, a verification system and the like which is capable of accurately performing verification with the same operational scenario between the virtual environment and the real environment will be described below.

In software development of a control device that controls a control target, the control device is verified. Hereinafter, the control device to be verified will also be referred to as a verification target. The verification target is verified in a real environment in which the control target is configured by hardware and in a virtual environment in which the control target is virtually configured (for example, environment in which emulation of the control target is executed). The verification system according to the embodiment is a system which verifies, as a verification target, a control device that controls a control target. The verification system uses actual responsiveness that is responsiveness for the verification performed on the verification target in a real environment and virtual responsiveness that is responsiveness for the verification performed on the verification target in a virtual environment. First, a real environment will be described with reference to FIG. 1.

Figure 1:
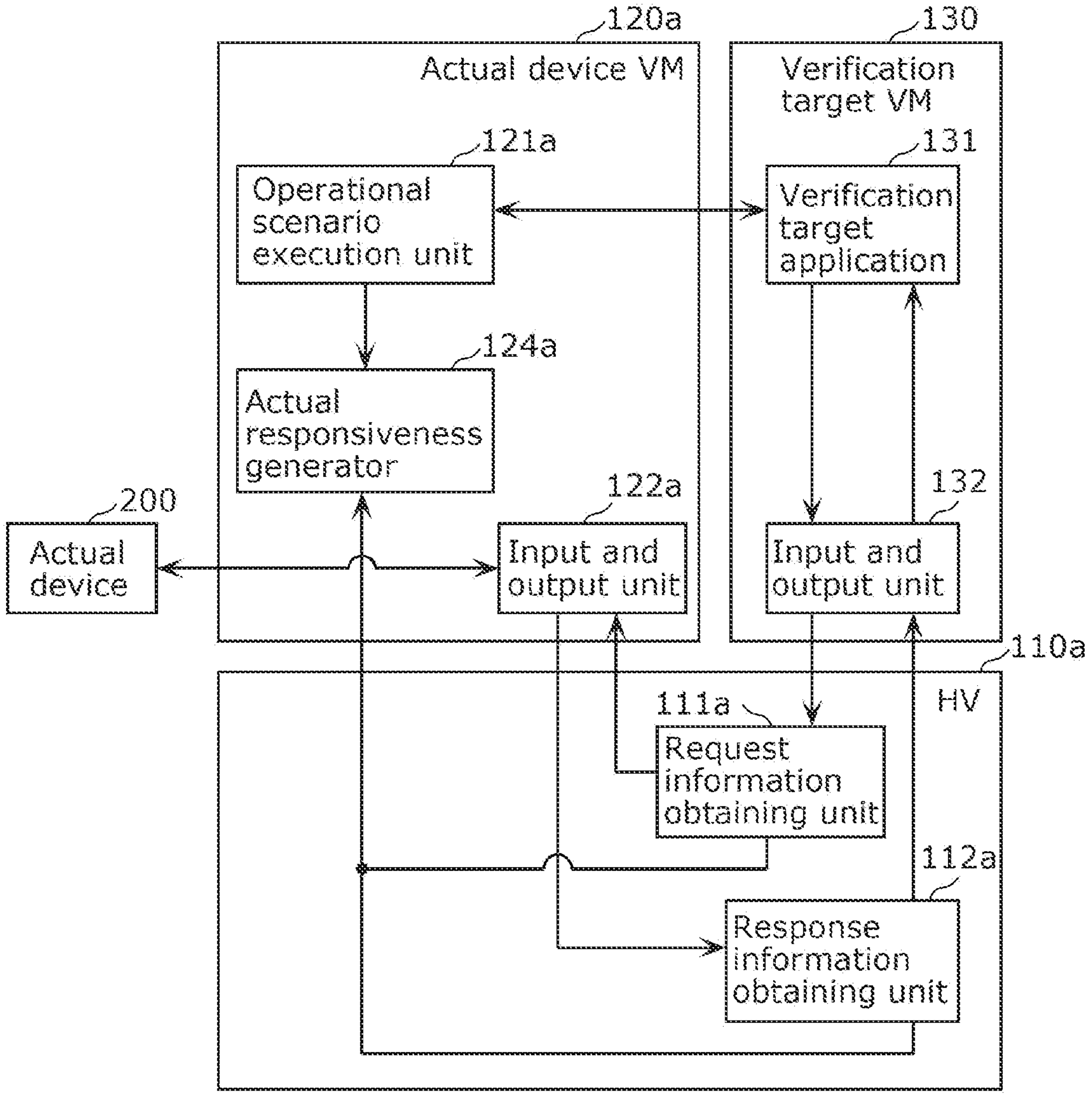
FIG. 1 is a configuration diagram illustrating an example of a real environment according to an embodiment.

FIG. 1 is a configuration diagram illustrating an example of a real environment according to the embodiment.

The real environment is an environment in which the control target to be controlled by the verification target is configured by hardware. In FIG. 1, actual device 200 is illustrated as the control target. For example, when the verification target is an in-vehicle device, actual device 200 is an electronic control unit (ECU) or a touch screen display for in-vehicle information (IVI) controlled by the in-vehicle device via a controller area network (CAN), Ethernet (registered trademark) or the like. Actual device 200 performs an operation that is in accordance with an operation request from verification target VM 130 to be described later, and outputs an operation response which is a response to the operation request.

For example, the verification target is constructed by a virtualized system. The virtualized system is a system which has been virtualized, and includes a plurality of virtual machines (VMs) managed by a virtualized infrastructure such as a hypervisor (HV). The HV is also referred to as a virtualized monitor or a virtualized operating system (OS). FIG. 1 illustrates, as a virtualized system, HV 110*a*, and actual device VM 120*a* and verification target VM 130 which are a plurality of VMs managed by HV 110*a*. Note that VMs, which are not illustrated and other than actual device VM 120*a* and verification target VM 130, may also be managed by HV 110*a*.

HV 110*a* is a functional element for realizing one or more VMs, and manages actual device VM 120*a* and verification target VM 130. HV 110*a* includes request information obtaining unit 111*a* and response information obtaining unit 112*a*.

Request information obtaining unit 111*a* obtains, from verification target VM 130, request information that is from verification target VM 130 to actual device 200. The request information includes information indicating an operation request to actual device 200. Request information obtaining unit 111*a* outputs the obtained request information to actual device 200. Here, request information obtaining unit 111*a* outputs the request information to actual device 200 via actual device VM 120*a*. Moreover, request information obtaining unit 111*a* outputs, to actual device VM 120*a*, the request time that is the time when the request information was obtained.

Response information obtaining unit 112*a* obtains, from actual device 200 (specifically, via actual device VM 120*a*), response information that is from actual device 200 to verification target VM 130. The response information includes an operation response that is a response to the operation request. Response information obtaining unit 112*a* outputs the obtained response information to verification target VM 130. Moreover, response information obtaining unit 112*a* outputs the response time that is the time when the response information was obtained to actual device VM 120*a*.

HV 110*a* does not always have to include request information obtaining unit 111*a* and response information obtaining unit 112*a*, and actual device VM 120*a* may include request information obtaining unit 111*a* and response information obtaining unit 112*a*.

Actual device VM 120*a* is a VM which verifies verification target VM 130 in a real environment. Actual device VM 120*a* includes operational scenario execution unit 121*a*, input and output unit 122*a*, and actual responsiveness generator 124*a*.

Operational scenario execution unit 121*a* is a processor for causing verification target VM 130 to perform an operation that is in accordance with an operational scenario. The operational scenario is a test pattern for verifying verification target VM 130. For example, when actual device 200 is a touch screen display for IVI and verification target VM 130 is an IVI application, the operational scenario is a test pattern for causing verification target VM 130 to display music list screen, select test music data, and play the selected music data. After causing verification target VM 130 to perform an operation that is in accordance with the operational scenario, operational scenario execution unit 121*a* obtains a verification result from verification target VM 130.

Input and output unit 122*a* exchanges information between HV 110*a* and actual device 200. Specifically, input and output unit 122*a* obtains request information from HV 110*a*, outputs the obtained request information to actual device 200, obtains response information from actual device 200, and outputs the obtained response information to HV 110*a*.

Actual responsiveness generator 124*a* generates actual responsiveness that is responsiveness for the verification performed on verification target VM 130 in a real environment. The actual responsiveness refers to the time taken for actual device 200 that is the control target to make an operation response in response to the operation request to actual device 200. Specifically, actual responsiveness generator 124*a* generates, as actual responsiveness, the difference between the time when the response information was obtained by response information obtaining unit 112*a* and the time when the request information was obtained by request information obtaining unit 111*a*. In other words, the actual responsiveness is the time taken for actual device 200 to make a response after the operational scenario was executed.

In addition to the request time, request information obtaining unit 111*a* may also output, to actual responsiveness generator 124*a*, information indicating the operation request to actual device 200 included in the request information, and actual responsiveness generator 124*a* may generate actual responsiveness by associating the request time with the information indicating the operation request to actual device 200.

In addition to the response time, response information obtaining unit 112*a* may also output, to actual responsiveness generator 124*a*, an operation response which is included in the response information and which is a response to the operation request to actual device 200, and actual responsiveness generator 124*a* may generate actual responsiveness by associating the response time with information indicating the operation response from actual device 200.

Verification target VM 130 is a control device which controls actual device 200 that is a control target, and is, for example, implemented by a VM. Verification target VM 130 includes verification target application 131 and input and output unit 132.

Verification target application 131 is an application that is verified in the software development of verification target VM 130. Verification target application 131 performs an operation that is in accordance with an operational scenario. Verification target application 131 outputs request information including an operation request that is made to actual device 200 by performing an operation that is in accordance with an operational scenario. Specifically, verification target application 131 notifies input and output unit 132 of the request information.

Input and output unit 132 exchanges information with HV 110*a*. Specifically, input and output unit 132 outputs, to HV 110*a*, the request information obtained from verification target application 131, and obtains response information from HV 110*a*. The response information obtained by input and output unit 132 is notified to verification target application 131, and verification target application 131 notifies actual device VM 120*a* of the end of the operation that is in accordance with the operational scenario.

Next, an operation of each structural element performed when actual responsiveness is generated in a real environment will be described with reference to FIG. 2.

Figure 2:
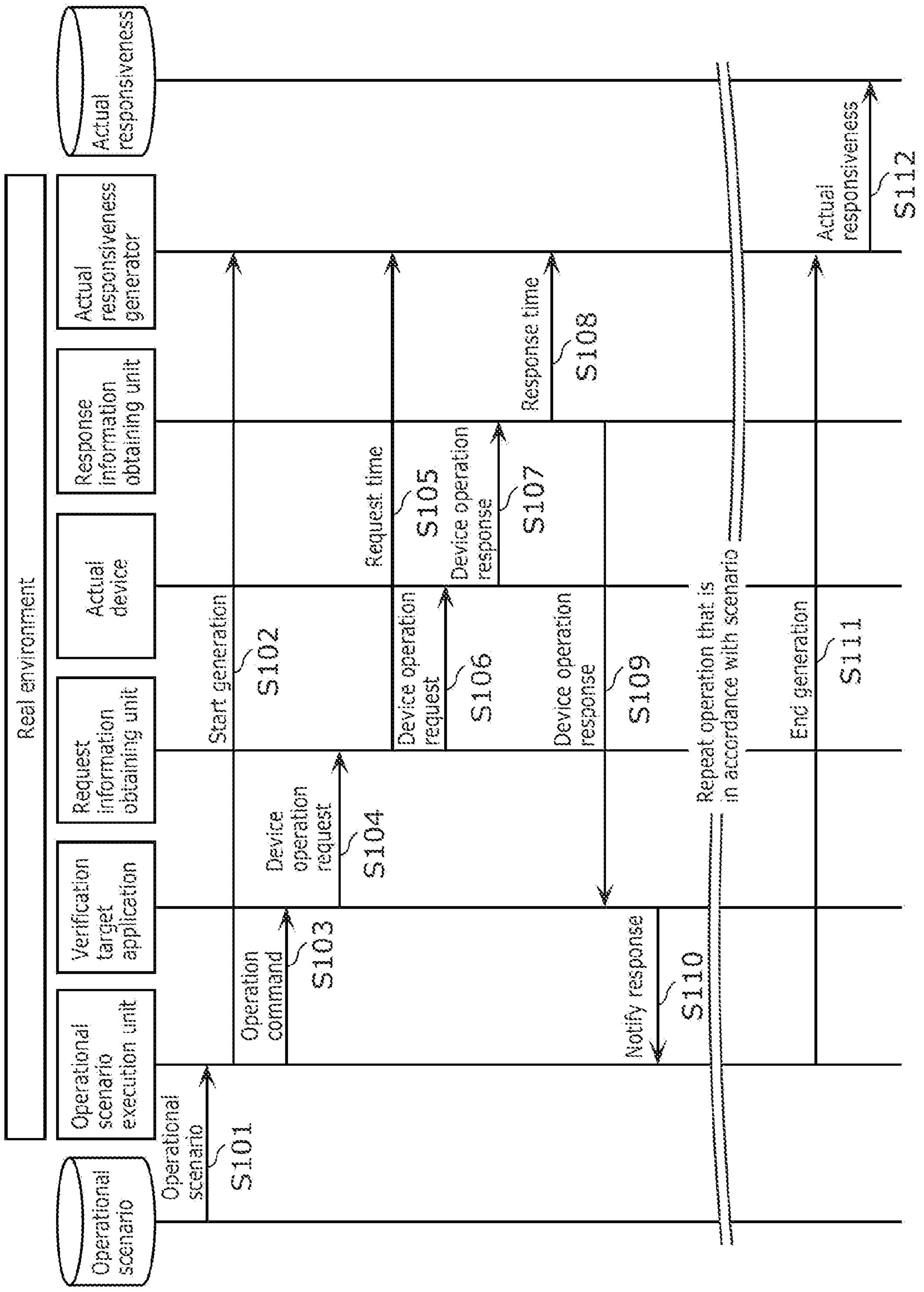
FIG. 2 is a sequence diagram when actual responsiveness for verification performed on a verification target in a real environment is generated according to the embodiment.

FIG. 2 is a sequence diagram when actual responsiveness for the verification performed on the verification target (verification target VM 130) in a real environment is generated according to the embodiment.

First, operational scenario execution unit 121*a* obtains an operational scenario (step S101). For example, an operational scenario corresponding to verification target VM 130 is stored in a given memory, and operational scenario execution unit 121*a* obtains the operational scenario corresponding to verification target VM 130 from the memory.

Operational scenario execution unit 121*a* notifies actual responsiveness generator 124*a* of the start of the generation of the actual responsiveness (step S102). Accordingly, actual responsiveness generator 124*a* is capable of starting the generation of the actual responsiveness.

Moreover, operational scenario execution unit 121*a* notifies verification target application 131 of an operation command that is in accordance with the operational scenario (step S103). When an operational scenario is divided into a plurality of portions along a scenario, operational scenario execution unit 121*a* notifies verification target application 131 of an operation command for each portion.

Verification target application 131 outputs request information including an operation request that is made to actual device 200 (step S104). Request information obtaining unit 111*a* obtains the request information output from verification target application 131.

Request information obtaining unit 111*a* outputs the request time that is the time when the request information was obtained (step S105). Actual responsiveness generator 124*a* obtains the request time output from request information obtaining unit 111*a*.

Moreover, request information obtaining unit 111*a* outputs request information including an operation request that is made to actual device 200 (step S106). Actual device 200 obtains the request information output from request information obtaining unit 111*a*, and performs an operation that is in accordance with the operation request.

Actual device 200 completes the operation that is in accordance with the operation request, and outputs response information including an operation response to the operation request (step S107). Response information obtaining unit 112*a* obtains the response information output from actual device 200.

Response information obtaining unit 112*a* outputs the response time that is the time when the response information was obtained (step S108). Actual responsiveness generator 124*a* obtains the response time output from response information obtaining unit 112*a*. Actual responsiveness generator 124*a* generates actual responsiveness based on the obtained response time and request time. When the operational scenario is divided into a plurality of portions along a scenario, actual responsiveness generator 124*a* generates actual responsiveness for each portion.

Moreover, response information obtaining unit 112*a* outputs response information including the operation response from actual device 200 (step S109). Verification target application 131 obtains the response information output from response information obtaining unit 112*a*. Accordingly, verification target application 131 is capable of recognizing that the requested operation has been executed.

Verification target application 131 notifies operational scenario execution unit 121*a* that a response to the operation request has been made (step S110).

When the operational scenario is divided into a plurality of portions along a scenario, the processes of step S103 to step S110 will be repeatedly performed for each portion. When operational scenario execution unit 121*a* receives a notification that the response to the operation request has been made for all the portions of the operational scenario, operational scenario execution unit 121*a* notifies actual responsiveness generator 124*a* of the end of generation of the actual responsiveness (step S111). Accordingly, actual responsiveness generator 124*a* is capable of ending the generation of the actual responsiveness.

Actual responsiveness generator 124*a* stores the generated actual responsiveness in a given memory (step S112). When the actual responsiveness is generated for each portion of the operational scenario, actual responsiveness generator 124*a* stores, in the memory, the actual responsiveness generated for each portion.

In such a manner, actual responsiveness for the verification performed on verification target VM130 in a real environment is generated.

Next, a virtual environment will be described with reference to FIG. 3.

Figure 3:
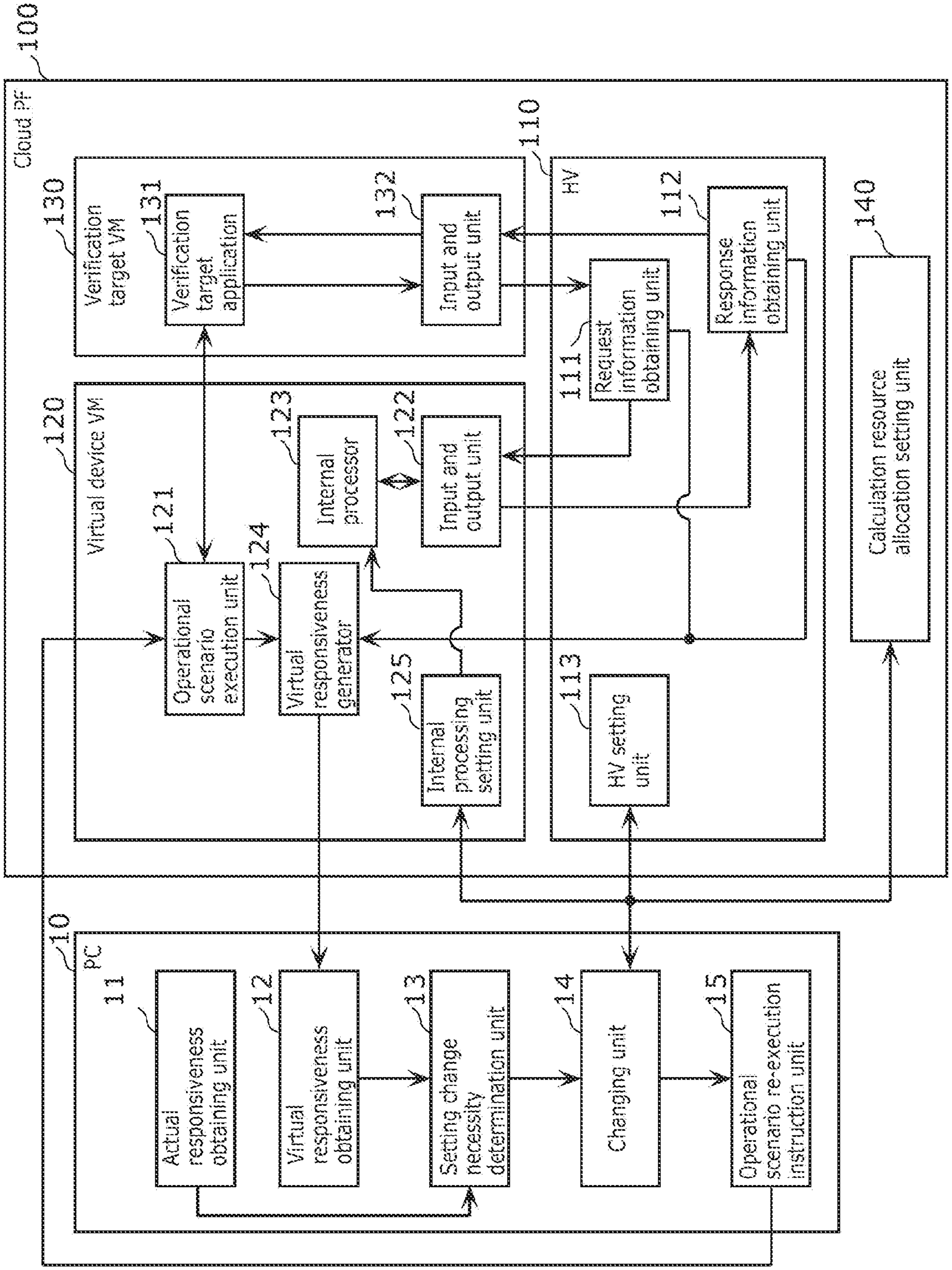
FIG. 3 is a configuration diagram illustrating an example of a virtual environment according to the embodiment.

FIG. 3 is a configuration diagram illustrating an example of a virtual environment according to the present embodiment. For example, a virtual environment is provided in a cloud platform (cloud PF) 100. FIG. 3 also illustrates personal computer (PC) 10 in addition to cloud PF 100.

The virtual environment is an environment in which the control target that is controlled by the verification target is virtually configured. In cloud PF 100, emulation of actual device 200 illustrated in FIG. 1 is performed. In the virtual environment, actual hardware such as an ECU does not have to be prepared, and actual hardware such as an ECU is imitated by software.

As described above, for example, a verification target and the like is constructed by a virtualized system. In FIG. 3, a virtualized system is provided in cloud PF 100, and as a virtualized system, HV 110, and virtual device VM 120 and verification target VM 130, which are a plurality of VMs managed by HV 110, are illustrated. For example, verification target VM 130 that is verified in the virtual environment (specifically, verification target application 131) is the same as verification target VM 130 (specifically, verification target application 131) that is verified in the real environment. The real environment includes HV 110*a*, and the virtual environment includes HV 110. The VMs on the HV is operable without changing verification target VM 130 between the real environment and the virtual environment. It is to be noted that VMs which are not illustrated and other than virtual device VM 120 and verification target VM 130 may also be managed by HV 110.

HV 110 is a functional element for realizing one or more VMs, and manages virtual device VM 120 and verification target VM 130. HV 110 includes request information obtaining unit 111, response information obtaining unit 112, and HV setting unit 113.

Request information obtaining unit 111 obtains, from verification target VM 130, request information that is from verification target VM 130 to actual device 200. The request information includes an operation request to actual device 200. In the virtual environment, actual device 200 does not exist, and thus, request information obtaining unit 111 outputs the obtained request information to virtual device VM 120 which executes emulation of actual device 200. Request information obtaining unit 111 also outputs, to virtual device VM 120, the request time that is the time when the request information was obtained.

Response information obtaining unit 112 obtains, from virtual device VM 120, the response information that is from virtual device VM 120 to verification target VM 130. The response information includes an operation response to the operation request. Response information obtaining unit 112 outputs the obtained response information to verification target VM 130. Response information obtaining unit 112 also outputs, to virtual device VM 120, the response time that is the time when the response information was obtained.

HV setting unit 113 is a processor which performs the setting of HV 110 included in the virtual environment. The setting of HV 110 may be changed by changing unit 14 to be described later. The details of the setting of HV 110 will be described later.

HV 110 does not have to include request information obtaining unit 111 and response information obtaining unit 112, but virtual device VM 120 may include request information obtaining unit 111 and response information obtaining unit 112.

Virtual device VM 120 is a VM for verifying verification target VM 130 in a virtual environment. Virtual device VM 120 includes operational scenario execution unit 121, input and output unit 122, internal processor 123, virtual responsiveness generator 124, and internal processing setting unit 125.

Operational scenario execution unit 121 is a processor for causing verification target VM 130 to perform an operation that is in accordance with an operational scenario. Operational scenario execution unit 121 executes the operational scenario that is the same as the operational scenario executed in the real environment. Operational scenario execution unit 121 causes verification target VM 130 to perform an operation that is in accordance with the operational scenario, and then obtains a verification result from verification target VM 130.

Input and output unit 122 exchanges information with HV 110. Specifically, input and output unit 122 obtains response information from HV 110, and notifies internal processor 123 of the obtained request information, and also obtains response information from internal processor 123, and outputs the obtained response information to HV 110.

Internal processor 123 is a processor which executes emulation of actual device 200. Internal processor 123 performs internal processing as if actual device 200 has performed an operation that is in accordance with the operation request from verification target VM 130, and outputs an operation response that is a response to the operation request.

Virtual responsiveness generator 124 generates virtual responsiveness that is responsiveness for the verification performed on verification target VM 130 in the virtual environment. The virtual responsiveness refers to the time taken for internal processor 123 that is the control target virtually constructed to make an operation response to the operation request made to actual device 200 that is the control target. Specifically, virtual responsiveness generator 124 generates, as virtual responsiveness, the difference between the time when the response information was obtained by response information obtaining unit 112 and the time when the request information was obtained by request information obtaining unit 111. In other words, the virtual responsiveness is the time taken from when the operational scenario was executed till when a response was made by internal processor 123. Virtual responsiveness generator 124 outputs the generated virtual responsiveness to PC 10.

In addition to the request time, request information obtaining unit 111 may also output, to virtual responsiveness generator 124, information indicating an operation request to actual device 200 included in the request information, and virtual responsiveness generator 124 may generate virtual responsiveness by associating the request time with information indicating the operation request to actual device 200.

Moreover, in addition to the response time, response information obtaining unit 112 may also output, to virtual responsiveness generator 124, an operation response that is a response to the operation request made to actual device 200 included in the response information, and virtual responsiveness generator 124 may generate virtual responsiveness by associating the response time with information indicating the operation response from actual device 200 (internal processor 123).

Internal processing setting unit 125 is a processor which performs the setting of a device (that is internal processor 123 in virtual device VM 120) which executes emulation of a control target in a virtual environment. The setting of internal processor 123 may be changed by changing unit 14 to be described later. The details of the setting of internal processor 123 will be described later.

Calculation resource allocation setting unit 140 is a processor which sets allocation of the calculation resources in the platform (cloud PF 100) in which the virtual environment is provided. The setting of allocation of the calculation resources in cloud PF 100 can be changed by changing unit 14 to be described later. The details of the setting of the allocation of the calculation resources in cloud PF 100 will be described later.

In the real environment, the control target is configured by hardware, and in the virtual environment, the control target is virtually configured. Since the environments are different, actual responsiveness and virtual responsiveness are different from each other. In the virtual environment in which virtual responsiveness is different from actual responsiveness, when verification target VM 130 is verified with the same operational scenario as the operational scenario used in the real environment, a correct verification result is unlikely to be obtained. Hence, it is necessary to bring the virtual responsiveness closer to the actual responsiveness. In the present disclosure, the verification system includes PC 10 which has a function of bringing the virtual responsiveness closer to the actual responsiveness.

PC 10 is a computer which has a function of bringing the virtual responsiveness closer to the actual responsiveness, and includes actual responsiveness obtaining unit 11, virtual responsiveness obtaining unit 12, setting change necessity determination unit 13, changing unit 14, and operational scenario re-execution instruction unit 15. PC 10 includes a processor, a memory, and the like. The memory is, for example, a read only memory (ROM) or a random access memory (RAM), and is capable of storing a program executed by the processor. Actual responsiveness obtaining unit 11, virtual responsiveness obtaining unit 12, setting change necessity determination unit 13, changing unit 14, and operational scenario re-execution instruction unit 15 are implemented by a processor or the like which executes the program stored in the memory.

Actual responsiveness obtaining unit 11 obtains actual responsiveness that is responsiveness for the verification performed on verification target VM 130 in the real environment in which the control target is configured by hardware. Specifically, actual responsiveness obtaining unit 11 obtains the actual responsiveness generated by actual responsiveness generator 124*a* of actual device VM 120*a*.

Virtual responsiveness obtaining unit 12 obtains virtual responsiveness that is responsiveness for the verification performed on verification target VM 130 in the virtual environment in which the control target is virtually configured. Specifically, virtual responsiveness obtaining unit 12 obtains the virtual responsiveness generated by virtual responsiveness generator 124 of virtual device VM 120.

Setting change necessity determination unit 13 determines whether or not the setting of the virtual environment needs to be changed. For example, setting change necessity determination unit 13 determines whether or not the setting of the virtual environment needs to be changed, based on the difference between the virtual responsiveness and the actual responsiveness. When the difference between the virtual responsiveness and the actual responsiveness is greater than or equal to a predetermined value, setting change necessity determination unit 13 determines that the setting of the virtual environment needs to be changed, and processing is performed by changing unit 14. When the difference between the virtual responsiveness and the actual responsiveness is less than the predetermined value, setting change necessity determination unit 13 determines that the setting of the virtual environment needs no change. In such a case, the responsiveness is almost the same between the virtual environment and the real environment, and thus, it is possible to accurately perform verification with the same operational scenario between the virtual environment and the real environment. The predetermined value is not particularly limited, but the predetermined value is set to such a value that, when the difference between the virtual responsiveness and the actual responsiveness is less than the predetermined value, the virtual responsiveness and the actual responsiveness can be regarded as being almost the same.

Changing unit 14 changes the setting of the virtual environment to bring the virtual responsiveness obtained by virtual responsiveness obtaining unit 12 closer to the actual responsiveness obtained by actual responsiveness obtaining unit 11.

For example, the setting of the virtual environment may include the setting of the allocation of the calculation resources in cloud PF 100 in which the virtual environment is provided. The setting of the allocation of the calculation resources in cloud PF 100 is, for example, the setting of the calculation resources allocated to respective functions of the virtualized system or the like provided in cloud PF 100 (for example, the setting of the number of CPU cores, used memory capacity, or storage access speed).

For example, the setting of the virtual environment may include the setting of HV 110 included in the virtual environment. Examples of the setting of HV 110 include the setting of the calculation resources allocated to respective ones of a plurality of VMs (for example, virtual device VM 120, verification target VM 130 and other VMs that are not illustrated) operating on HV 110 (for example, the setting of the number of CPU cores, or used memory capacity), and the setting of CPU allocation priority level. For example, when the virtual responsiveness of verification target VM 130 is faster than the actual responsiveness, the CPU allocation priority level of verification target VM 130 is reduced, and when the virtual responsiveness of verification target VM 130 is slower than the actual responsiveness, the CPU allocation priority level of verification target VM 130 is increased, to bring the virtual responsiveness closer to the actual responsiveness.

For example, the setting of the virtual environment may include the setting of internal processor 123 of virtual device VM 120. Examples of the setting of internal processor 123 of virtual device VM 120 include the setting of the priority level of the device access processing, the setting of the processing priority level of each process that operates in OS, and the setting of the memory capacity used by internal processor 123. The setting of the priority level of the device access processing is, for example, setting of, when internal processor 123 is receiving access processing requests from a plurality of VMs, an access processing request to be prioritized.

Changing unit 14 is capable of adjusting the virtual responsiveness by changing one or more of the settings of the virtual environment described above via calculation resource allocation setting unit 140, HV setting unit 113, and internal processing setting unit 125.

Operational scenario re-execution instruction unit 15 instructs operational scenario execution unit 121 to re-execute the operational scenario. Accordingly, virtual responsiveness is generated in the virtual environment in which the setting has been changed, and virtual responsiveness obtaining unit 12 obtains virtual responsiveness that is in accordance with the changed virtual environment. Changing unit 14 changes the setting of the virtual environment again when the setting of the virtual environment is determined to need a change. For example, it is possible to bring the virtual responsiveness closer to the actual responsiveness by repeatedly changing the setting of the virtual environment by trial and error while checking if the virtual responsiveness is approaching the actual responsiveness. In such a manner, the verification system (for example, PC 10) repeatedly causes virtual responsiveness obtaining unit 12 to obtain the virtual responsiveness and changing unit 14 to change the setting of the virtual environment.

It is sufficient that the verification system includes at least actual responsiveness obtaining unit 11, virtual responsiveness obtaining unit 12, and changing unit 14. As illustrated in FIG. 3, when actual responsiveness obtaining unit 11, virtual responsiveness obtaining unit 12, and changing unit 14 are included in PC 10, the verification system includes PC 10. Alternatively, the verification system may be PC 10. Actual responsiveness obtaining unit 11, virtual responsiveness obtaining unit 12, and changing unit 14 may be included in virtual device VM 120 or HV 110, and in such a case, the verification system includes cloud PF 100. Alternatively, the verification system may be cloud PF 100.

Next, an operation of each structural element performed when virtual responsiveness is generated in the virtual environment and an operation performed when the setting of the virtual environment is changed will be described with reference to FIG. 4.

Figure 4:
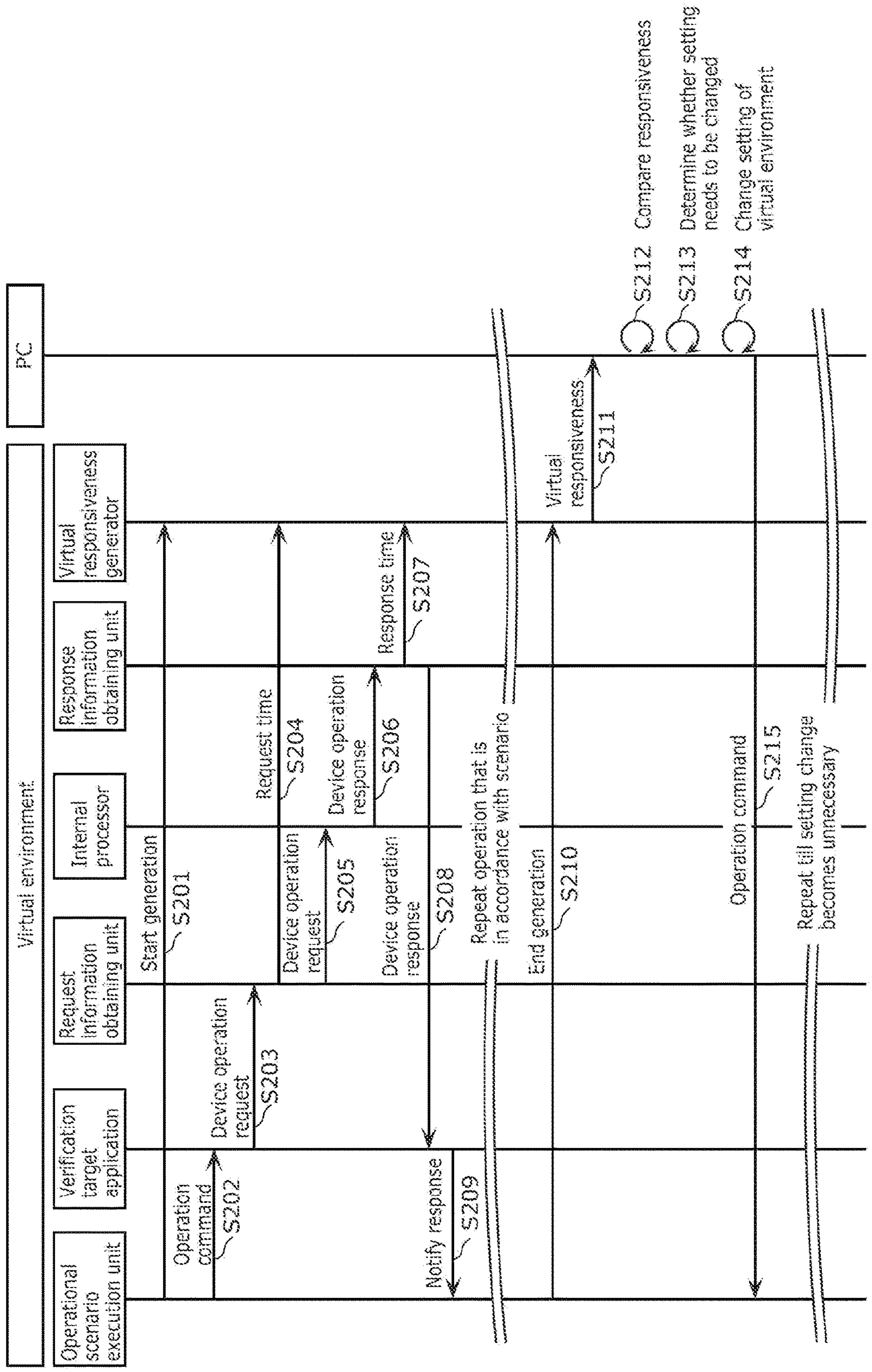
FIG. 4 is a sequence diagram when actual responsiveness for verification performed on the verification target in the virtual environment is generated and a setting of the virtual environment is changed according to the present embodiment.

FIG. 4 is a sequence diagram when virtual responsiveness for the verification performed on verification target VM 130 in the virtual environment is generated and a setting of the virtual environment is changed according to the present embodiment.

First, operational scenario execution unit 121 obtains an operational scenario, and notifies virtual responsiveness generator 124 of the start of the generation of virtual responsiveness (step S201). Accordingly, virtual responsiveness generator 124 is capable of starting the generation of the virtual responsiveness.

Operational scenario execution unit 121 also notifies verification target application 131 of an operation command that is in accordance with the operational scenario (step S202). When the operational scenario is divided into a plurality of portions along the scenario, operational scenario execution unit 121 notifies verification target application 131 of an operation command for each portion.

Verification target application 131 outputs request information including an operation request that is made to actual device 200 (step S203). Request information obtaining unit 111 obtains the request information output from verification target application 131.

Request information obtaining unit 111 outputs the request time that is the time when the request information was obtained (step S204). Virtual responsiveness generator 124 obtains the request time output from request information obtaining unit 111.

Request information obtaining unit 111 also outputs request information including an operation request that is made to actual device 200 (step S205). Internal processor 123 which executes emulation of actual device 200 obtains the request information output from request information obtaining unit 111, and performs processing that is in accordance with the operation request.

Internal processor 123 completes the operation that is in accordance with the operation request, and outputs response information including an operation response that is made to the operation request (step S206). Response information obtaining unit 112 obtains the response information output from internal processor 123.

Response information obtaining unit 112 outputs the response time that is the time when the response information was obtained (step S207). Virtual responsiveness generator 124 obtains the response time output from response information obtaining unit 112. Virtual responsiveness generator 124 generates virtual responsiveness based on the obtained response time and request time. When the operational scenario is divided into a plurality of portions along a scenario, virtual responsiveness generator 124 generates virtual responsiveness for each portion.

Moreover, response information obtaining unit 112 outputs response information including an operation response from internal processor 123 (step S208). Verification target application 131 obtains response information output from response information obtaining unit 112. Accordingly, verification target application 131 is capable of recognizing that the requested operation has been executed.

Verification target application 131 notifies operational scenario execution unit 121 that a response to the operation request has been made (step S209).

When the operational scenario is divided into a plurality of portions along a scenario, the processes from step S202 to step S209 are repeatedly performed for each portion. When operational scenario execution unit 121 receives the notification that the response to the operation request has been made for all portions of the operational scenario, operational scenario execution unit 121 notifies virtual responsiveness generator 124 of the end of the generation of the virtual responsiveness (step S210). Accordingly, virtual responsiveness generator 124 is capable of ending the generation of the virtual responsiveness.

Virtual responsiveness generator 124 outputs the generated virtual responsiveness to PC 10 (step S211). When the virtual responsiveness is generated for each portion of the operational scenario, virtual responsiveness generator 124 outputs the virtual responsiveness generated for each portion to PC 10.

PC 10 compares the actual responsiveness generated in the real environment with the virtual responsiveness generated in the virtual environment (step S212). When the operational scenario is divided into a plurality of portions along a scenario, PC 10 compares the actual responsiveness and corresponding virtual responsiveness for each portion. For example, PC 10 calculates the difference between the actual responsiveness and the virtual responsiveness.

Next, PC 10 determines whether or not the setting of the virtual environment needs to be changed (step S213). For example, when the difference between the actual responsiveness and the virtual responsiveness is greater than or equal to a predetermined value, PC 10 determines that the setting of the virtual environment needs to be changed, and when the difference between the actual responsiveness and the virtual responsiveness is less than the predetermined value, PC 10 determines that the setting of the virtual environment needs no change.

When the setting of the virtual environment needs to be changed, PC 10 changes the setting of the virtual environment (step S214). For example, PC 10 changes the setting of the virtual environment according to whether the virtual responsiveness is faster or slower than the actual responsiveness, the magnitude of the difference between the virtual responsiveness and the actual responsiveness, or the like.

PC 10 then instructs operational scenario execution unit 121 to execute the same operational scenario again in the virtual environment in which the setting has been changed (step S215). Accordingly, in the virtual environment in which the setting has been changed, the processes from step S201 to step S211 are performed again. In addition, the processes from step S212*t* to step S213 are performed with the virtual responsiveness generated in the virtual environment in which the setting has been changed. Such processes are repeatedly performed till the setting of the virtual environment needs no change (in other words, till the difference between the actual responsiveness and the virtual responsiveness becomes less than the predetermined value). In such a manner, it is possible to gradually bring the virtual responsiveness closer to the actual responsiveness.

Conclusion

A verification system (for example, PC 10) is a verification system which verifies, as a verification target, a control device that controls a control target. The verification system includes actual responsiveness obtaining unit 11 which obtains actual responsiveness that is responsiveness for the verification performed on the verification target in a real environment in which the control target is configured by hardware; virtual responsiveness obtaining unit 12 which obtains virtual responsiveness that is responsiveness for the verification performed on the verification target in a virtual responsiveness in which the control target is configured virtually; and changing unit 14 which changes the setting of the virtual environment to bring the virtual responsiveness closer to the actual responsiveness.

Examples of the setting of the virtual environment include the setting of allocation of the calculation resources in a platform in which the virtual environment is provided, the setting of the HV included in the virtual environment, and the setting of a device which executes emulation of a control target in the virtual environment. By changing these settings, the virtual responsiveness for the verification performed on the verification target in the virtual environment can be adjusted. Accordingly, by changing the setting of the virtual environment, it is possible to bring the virtual responsiveness for the verification performed on the verification target in the virtual environment closer to the actual responsiveness for the verification performed on the verification target in the real environment. In other words, by changing the setting of the virtual environment to bring the virtual responsiveness closer to the actual responsiveness, it is possible to perform verification with the same operational scenario between the virtual environment and the real environment.

For example, the verification system may repeatedly cause virtual responsiveness obtaining unit 12 to obtain the virtual responsiveness and changing unit 14 to change the setting of the virtual environment.

For example, since it is difficult to bring the virtual responsiveness closer to the actual responsiveness by a single change to the setting of the virtual environment, obtainment of the virtual responsiveness and the changing to the setting of the virtual environment are repeatedly performed to bring the virtual responsiveness closer to the actual responsiveness.

For example, each of the real environment and the virtual environment may include a HV.

The VM on the HV is operable with no change to the verification target between the real environment and the virtual environment. This eliminates the need for the change to the verification target between the virtual environment and the real environment.

For example, the verification target that is verified in the real environment and the verification target that is verified in the virtual environment may be the same control device.

In such a manner, the same control device may be verified as the verification target between the real environment and the virtual environment.

For example, the setting of the virtual environment may include the setting of the allocation of the calculation resources in the platform in which the virtual environment is provided.

By changing the setting of the allocation of the calculation resources in the platform in which the virtual environment is provided as described above, it is possible to bring the virtual responsiveness closer to the actual responsiveness.

For example, the setting of the virtual environment may include the setting of the HV included in the virtual environment.

By changing the setting of the HV included in the virtual environment as described above, it is possible to bring the virtual responsiveness closer to the actual responsiveness.

For example, the setting of the virtual environment may include the setting of the device which executes emulation of the control target.

By changing the setting of the device which executes emulation of the control target as described above, it is possible to bring the virtual responsiveness closer to the actual responsiveness.

Other Embodiments

The embodiment has been described above as an example of the technique according to the present disclosure. However, the technique according to the present disclosure is not limited to the above example, and can be applied to embodiments in which changes, replacements, additions, omissions, etc. are made as appropriate. For example, variations as described below are included in one embodiment of the present disclosure.

For example, in the embodiment described above, the example has been described where the verification system repeatedly causes virtual responsiveness obtaining unit 12 to obtain the virtual responsiveness and changing unit 14 to change the setting of the virtual environment. However, the verification system does not have to cause virtual responsiveness obtaining unit 12 to obtain the virtual responsiveness and changing unit 14 to change the setting of the virtual environment.

For example, in the embodiment described above, the example has been described where an operational scenario is divided into a plurality of portions along a scenario, however, the present disclosure is not limited to such an example. For example, some operational scenarios are not divided into a plurality of portions along a scenario. In such a case, the processes from step S103 to step S110 in FIG. 2 and the processes from step S202 to step S209 in FIG. 4 do not have to be repeatedly performed.

For example, in the above embodiment, the example has been described where the setting of the virtual environment is changed based on the actual responsiveness and the virtual responsiveness made when one operational scenario is executed. However, the present disclosure is not limited to such an example. For example, the setting of the virtual environment may be changed based on the actual responsiveness and the virtual responsiveness made when a plurality of operational scenarios are successively executed. In such a case, the setting of the virtual environment is changed to bring the average value of the virtual responsiveness for each of the operational scenarios closer to the average value of the actual responsiveness for each of the operational scenarios.

The present disclosure can be realized not only as a verification system, but also as a verification method which includes the steps (processes) performed by each structural element included in the verification system.

Figure 5:
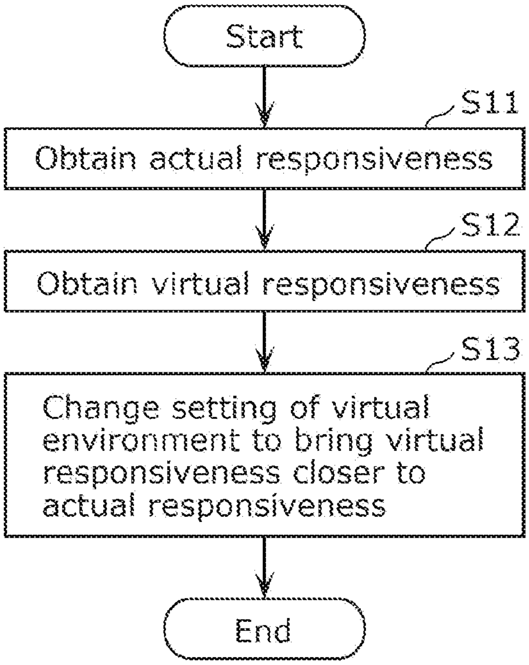
FIG. 5 is a flowchart illustrating an example of a verification method according to another embodiment.

FIG. 5 is a flowchart illustrating an example of a verification method according to another embodiment.

The verification method is a method for verifying, as a verification target, a control device that controls a control target. As illustrated in FIG. 5, the method includes: obtaining actual responsiveness that is responsiveness for verification performed on the verification target in a real environment in which the control target is configured by hardware (step S11); obtaining virtual responsiveness that is responsiveness for verification performed on the verification target in a virtual environment in which the control target is configured virtually (step S12); and changing a setting of the virtual environment to bring the virtual responsiveness closer to the actual responsiveness (step S13).

For example, the steps included in the verification method may be executed by a computer (computer system). The present disclosure can be realized as a program for causing the computer to execute the steps included in the verification method.

Moreover, the present disclosure can be realized as a non-transitory computer-readable recording medium such as a CD-ROM on which the program is recorded.

For example, when the present disclosure is realized by a program (software), each step is executed by executing the program using hardware resources such as the CPU, memory, and input and output circuit of the computer. In other words, each step is executed when the CPU obtains data from the memory, the input and output circuit, or the like and performs an operation, or outputs the operation result to the memory, the input and output circuit or the like.

In addition, each structural element included in the verification system according to the embodiment described above may be realized as a dedicated or a general circuit.

Moreover, the structural elements included in the verification system in the embodiment described above may be realized as a large scale integration (LSI) which is an integrated circuit (IC).

Moreover, the integrated circuit is not limited to the LSI, and may be realized by a dedicated circuit or a general-purpose processor. A programmable field programmable gate array (FPGA) or a reconfigurable processor in which the connection and settings of circuit cells inside the LSI can be reconfigured may be used.

Furthermore, if an integrated circuit technology that replaces an LSI appears due to advances in semiconductor technology or another technology derived from it, it is natural that the technology is used to create an integrated circuit of the structural elements included in the verification system.

In addition, a form obtained by making various modifications conceivable by those skilled in the art to the embodiment, and a form realized by arbitrarily combining the structural elements and functions in the embodiment without departing from the gist of the present disclosure are also included in the present disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent application including specification, drawings and claims are incorporated herein by reference in their entirety: Japanese Patent Application No. 2021-045994 filed on Mar. 19, 2021.

INDUSTRIAL APPLICABILITY

The present disclosure is applicable to, for example, a verification system which verifies an in-vehicle device which is mounted in a vehicle.

The invention claimed is:

1. A verification system which verifies, as a verification target, a control device that controls a control target, the verification system comprising:

a processor; and a memory including at least one set of instructions that, when executed by the processor, causes the processor to perform operations, the operations including:

obtaining actual responsiveness that is responsiveness for verification performed on the verification target in a real environment in which the control target is configured by hardware;

obtaining virtual responsiveness that is responsiveness for verification performed on the verification target in a virtual environment in which the control target is virtually configured;

repeatedly changing a setting of the virtual environment to bring the virtual responsiveness closer to the actual responsiveness, wherein the setting of the virtual environment includes a setting of a device which executes emulation of the control target, the setting of the device includes at least one of a setting of a priority level of a device access processing, or a setting of a processing priority level of each process that operates in an operating system, the setting of the priority level of the device access processing is a setting of, when the device is receiving a plurality of access processing requests from a plurality of devices, an access processing request to be prioritized included in the plurality of access processing requests, the changing the setting of the virtual environment changes the setting of the virtual environment by adjusting at least one of the setting of the priority level of the device access processing, or the setting of the processing priority level of each process that operates in the operating system so as to bring the virtual responsiveness closer to the actual responsiveness, when the virtual responsiveness is faster than the actual responsiveness, a CPU allocation priority level of the verification target is reduced, and when the virtual responsiveness is slower than the actual responsiveness, the CPU allocation priority level of the verification target is increased.

2. The verification system according to claim 1, wherein the verification system repeatedly causes the processor to obtain the virtual responsiveness.

3. The verification system according to claim 1, wherein each of the real environment and the virtual environment includes a hypervisor.

4. The verification system according to claim 1, wherein the verification target that is verified in the real environment and the verification target that is verified in the virtual environment are a same control device.

5. The verification system according to claim 1, wherein the setting of the virtual environment includes a setting of allocation of a calculation resource in a platform in which the virtual environment is provided.

6. The verification system according to claim 3, wherein the setting of the virtual environment includes a setting of the hypervisor included in the virtual environment.

7. The verification system according to claim 1, wherein the setting of the device includes the setting of the priority level of the device access processing, and the setting of the priority level of the device access processing is a setting of, when the device is receiving a plurality of access processing requests, an access processing request to be prioritized.

8. The verification system according to claim 1, wherein the changing the setting of the virtual environment changes the setting of the virtual environment by adjusting the setting of the priority level of the device access processing so as to bring the virtual responsiveness closer to the actual responsiveness.

9. A verification method for verifying, as a verification target, a control device that controls a control target, the verification method comprising:

obtaining actual responsiveness that is responsiveness for verification performed on the verification target in a real environment in which the control target is configured by hardware;

obtaining virtual responsiveness that is responsiveness for verification performed on the verification target in a virtual environment in which the control target is virtually configured; and repeatedly changing a setting of the virtual environment to bring the virtual responsiveness closer to the actual responsiveness, wherein the setting of the virtual environment includes a setting of a device which executes emulation of the control target, the setting of the device includes at least one of a setting of a priority level of a device access processing, or a setting of a processing priority level of each process that operates in an operating system, the setting of the priority level of the device access processing is a setting of, when the device is receiving a plurality of access processing requests from a plurality of devices, an access processing request to be prioritized included in the plurality of access processing requests, the changing the setting of the virtual environment changes the setting of the virtual environment by adjusting at least one of the setting of the priority level of the device access processing, or the setting of the processing priority level of each process that operates in the operating system so as to bring the virtual responsiveness closer to the actual responsiveness, when the virtual responsiveness is faster than the actual responsiveness, a CPU allocation priority level of the verification target is reduced, and when the virtual responsiveness is slower than the actual responsiveness, the CPU allocation priority level of the verification target is increased.

10. A non-transitory computer-readable recording medium for use in a computer, the recording medium having a computer program recorded thereon for causing the computer to execute the verification method according to claim 9.

* * * * *